(12) United States Patent
Tanner

(10) Patent No.: US 7,854,457 B2
(45) Date of Patent: Dec. 21, 2010

(54) GEARSHIFT FINISHER

(75) Inventor: Kevin Tanner, St Albans (GB)

(73) Assignee: Nissan Motor Manufacturing (UK) Ltd., Bedfordshire (GB)

( * ) Notice: Subject to any disclaimer, the term of this patent is extended or adjusted under 35 U.S.C. 154(b) by 389 days.

(21) Appl. No.: 11/615,373

(22) Filed: Dec. 22, 2006

(65) Prior Publication Data

US 2007/0144291 A1    Jun. 28, 2007

(30) Foreign Application Priority Data

Dec. 23, 2005  (GB) ................. 0526289.4
Nov. 30, 2006  (EP) ................. 06125088

(51) Int. Cl.
*B60R 13/02* (2006.01)

(52) U.S. Cl. ............ 296/1.08; 296/24.34; 74/566; 180/336

(58) Field of Classification Search ............ 296/24.34, 296/37.8, 39.1, 1.08; 180/315, 336; 74/523, 74/566

See application file for complete search history.

(56) References Cited

U.S. PATENT DOCUMENTS

| | | | |
|---|---|---|---|
| 3,971,564 A | | 7/1976 | Bowen et al. |
| 4,991,457 A | * | 2/1991 | Chen ................. 74/473.36 |
| 5,335,751 A | * | 8/1994 | Kuroki ................. 180/336 |
| 5,887,485 A | * | 3/1999 | VanOrder et al. ........ 74/473.15 |
| 5,924,333 A | * | 7/1999 | Futschik et al. ........... 74/566 |

FOREIGN PATENT DOCUMENTS

| | | |
|---|---|---|
| DE | 196 49 745 A1 | 6/1997 |
| DE | 196 41 705 C1 | 2/1998 |
| DE | 197 45 875 A1 | 4/1999 |
| DE | 103 23 977 A1 | 12/2004 |
| DE | 103 37 557 A1 | 3/2005 |
| EP | 1 568 543 A1 | 8/2005 |
| FR | 2 868 996 A1 | 10/2005 |
| JP | 63-61341 U | 4/1988 |
| JP | 9-156396 A | 6/1997 |
| JP | 10-159953 A | 6/1998 |

* cited by examiner

*Primary Examiner*—Glenn Dayoan
*Assistant Examiner*—Melissa A Black
(74) *Attorney, Agent, or Firm*—Foley & Lardner LLP

(57) ABSTRACT

A gearshift finisher assembly comprises a finisher for bridging a gap between a gear selector plate and an adjacent or surrounding vehicle trim panel and a retainer including means for attachment to the trim panel. The finisher is engaged with the retainer for floating movement of the finisher with respect to the retainer, for example by engaging formations associated with the finisher and the retainer. The finisher may be engaged with the retainer via an intermediate fastener such as a plastics frame spring clip shaped to engage the finisher and the retainer.

14 Claims, 6 Drawing Sheets

GEARSHIFT FINISHER

BACKGROUND OF THE INVENTION

1. Field of the Invention

This invention relates to gearshift finishers, particularly those suitable for use around the gear selector lever and gear selector plate of automatic transmission (A/T) vehicles.

2. Description of the Related Art

Some vehicles have gear selector levers on their steering columns, particularly some A/T vehicles where the lever may operate a switch that in turn controls the vehicle gearbox remotely via relays or other actuators. However most vehicles, and the vast majority of cars, have a gear selector lever mounted centrally between, or just ahead of, the driver's seat and the adjacent passenger seat.

Whilst some vehicles have a dashboard-mounted gear selector lever, the lever is most commonly mounted on the floor of the vehicle cabin, which expression includes a transmission tunnel or similar structure such as a console raised above the footwells of the cabin. That position corresponds to the typical gearbox location of front-engine, rear-wheel-drive cars that have their engine and gearbox in line with a propeller shaft extending through a transmission tunnel to the rear differential. Whilst rear-wheel-drive cars are now less common than front-wheel-drive cars in which the gearbox is usually on the end of a transversely-mounted engine (i.e. to one side of the engine bay), most gear selector levers remain in a familiar central location within the cabin. This is possible because a gear selector lever need not be connected directly to the gearbox that the lever controls: typically a linkage of cables or, more commonly, rods is used to connect the lever to the gearbox.

The gear selector lever of an A/T vehicle pivots between operational positions that typically include park, reverse, neutral, drive and low gear, known collectively by the abbreviation PRNDL. Movement of the lever takes place within a slot defined by a gear selector plate that surrounds the base of the lever. The gear selector plate may bear indicia such as the letters PRNDL appropriate to the operational positions of the lever. It may also have other functions, such as to support switches for selecting gearbox settings, traction control and so forth.

If the gear selector lever is attached to the gearbox either directly or via a linkage, movement or vibration of the gearbox in use of the vehicle will be transmitted to the lever. There are also substantial manufacturing tolerances in the position of the gear selector lever with respect to its intended location, affected by the alignment of the gearbox and/or linkage with respect to the vehicle. Consequently, the gear selector plate is mounted for movement with the lever so that there is always clearance around the lever in the slot within the plate.

Typically the gear selector plate is accommodated within a hole in a surrounding trim moulding such as a centre console moulding or a dashboard moulding. As the plate and the lever can move with respect to the vehicle structure due to movement or vibration of the gearbox, and as manufacturing tolerances must be taken into account, it follows that the plate can adopt various positions with respect to the surrounding trim moulding. A gap must therefore be left between the gear selector plate and the trim moulding. This raises the need for a finisher to bridge the gap between the plate and the moulding, and the need for the finisher to accommodate movement of the plate within the hole in the moulding.

SUMMARY OF THE INVENTION

Manual-transmission vehicles usually employ a flexible gaiter around the base of the gear selector lever that bridges the gap between the lever and the surrounding trim moulding and that accommodates movement of the lever relative to the moulding. Such an arrangement does not suffer from the problems with which the present invention is concerned. However, manual-transmission vehicles are not excluded from the ambit of the invention because some of them employ a gear selector plate or other rigid structure around the lever that is floatingly mounted with respect to surrounding or adjacent trim panels.

In the related gearshift finisher solution illustrated schematically in FIG. 1 of the drawings, a gear selector plate 10 has a C-section moulded finisher strip 12 around its periphery. The C-section of the strip 12 defines outwardly-facing parallel flanges 14, 16 that slidingly embrace the edge of a hole 18 in a surrounding trim panel 20. This arrangement bridges the gap between the plate 10 and the panel 20 while accommodating movement of the plate 10 relative to the panel 20. However, it restrains the aesthetic design of the plate 10, forcing the plate 10 to be largely flat around its periphery at least, and leaves an ugly visible joint between the plate 10 and the panel. Vehicle assembly is also difficult.

Against this background, according to a first aspect, the invention resides in a gearshift finisher assembly comprising: a finisher for bridging a gap between a gear selector plate and an adjacent or surrounding vehicle trim panel; and a retainer for attachment to the trim panel; wherein the finisher is engagable with the retainer for floating movement of the finisher with respect to the retainer.

The finisher may preferably be engagable with the retainer via a fastener shaped to engage the finisher and the retainer. This fastener may optionally be arranged resiliently to urge together the finisher and the retainer, and may for example be a plastics frame or a spring clip.

Advantageously, the finisher may have a skirt facing a gear selector plate.

The retainer may preferably be a ring that generally corresponds to the plan form of the finisher and accommodates a skirt depending from the finisher, with clearance between the skirt and the retainer ring to allow said floating movement.

The finisher may define a downwardly-facing bearing surface for sliding contact with an upper face of the retainer.

According to a second aspect, the invention resides in a fastener shaped to engage a finisher and a retainer of a gear shift finisher assembly, the fastener comprising a flexible frame having a plurality of formations for engaging the finisher and/or the retainer, the frame being arranged to hold together the finisher and the retainer.

From a third aspect, the invention resides in a method of mounting a gearshift finisher assembly to a vehicle with a gap between a gear selector plate and an adjacent or surrounding vehicle trim panel, the gearshift finisher assembly comprising a finisher for bridging the gap; and a retainer for attachment to the trim panel; wherein the finisher is engagable with the retainer for floating movement of the finisher with respect to the retainer, the method comprising: attaching the retainer to the trim panel; engaging the finisher with the retainer so as to allow floating movement of the finisher with respect to the retainer; and attaching the finisher to the gear selector plate.

The inventive concept extends to a vehicle fitted with the gearshift finisher assembly of the invention.

BRIEF DESCRIPTION OF THE DRAWINGS

The invention will now be described with reference to the accompanying drawings wherein.

DETAILED DESCRIPTION OF THE PREFERRED EMBODIMENT

In order that the invention may be more readily understood, two embodiments of the invention will now be described, by way of example, with reference to the drawings.

A first embodiment of the invention will now be described with reference to FIGS. 2A, 2B.

Figure 1:
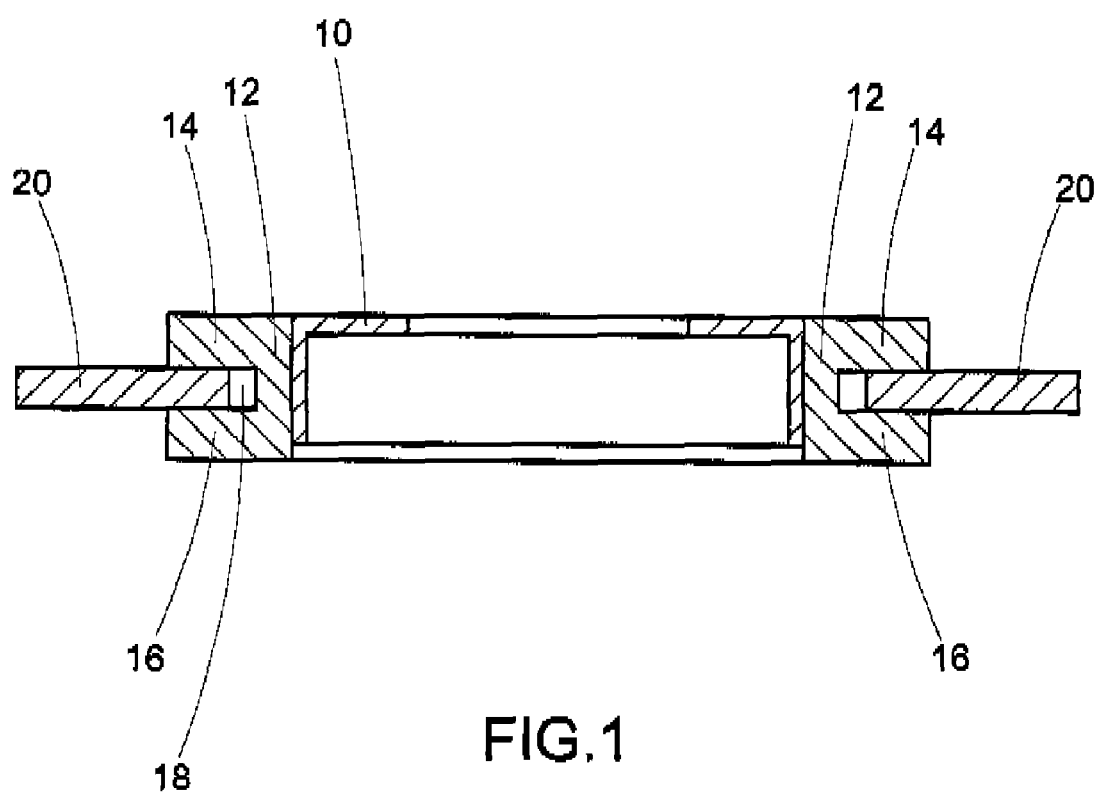
FIG. 1 is a schematic sectional side view of a related art gearshift finisher arrangement.
Figure 2A:
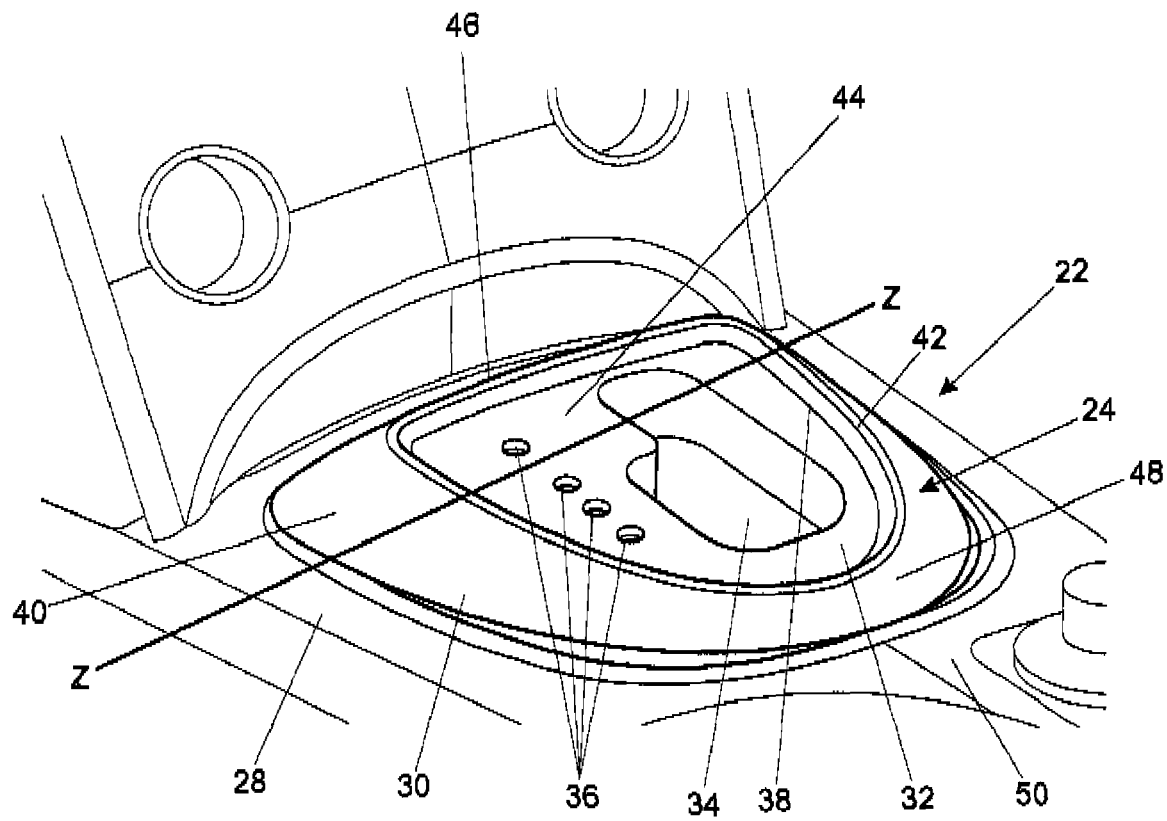
FIG. 2A is a perspective view from above of a gearshift finisher assembly in accordance with a first embodiment of the invention, on a centre console within a vehicle cabin.

FIG. 2A of the drawings shows a gearshift finisher assembly 24 in accordance with the invention that is set into an opening 26 in a trim moulding 28 defining an upper surface of a centre console 22. The main parts of the assembly 24 visible in FIGS. 2A and 2B are a finisher 30, a retaining ring 52, and a plastics frame 100.

Figure 2B:
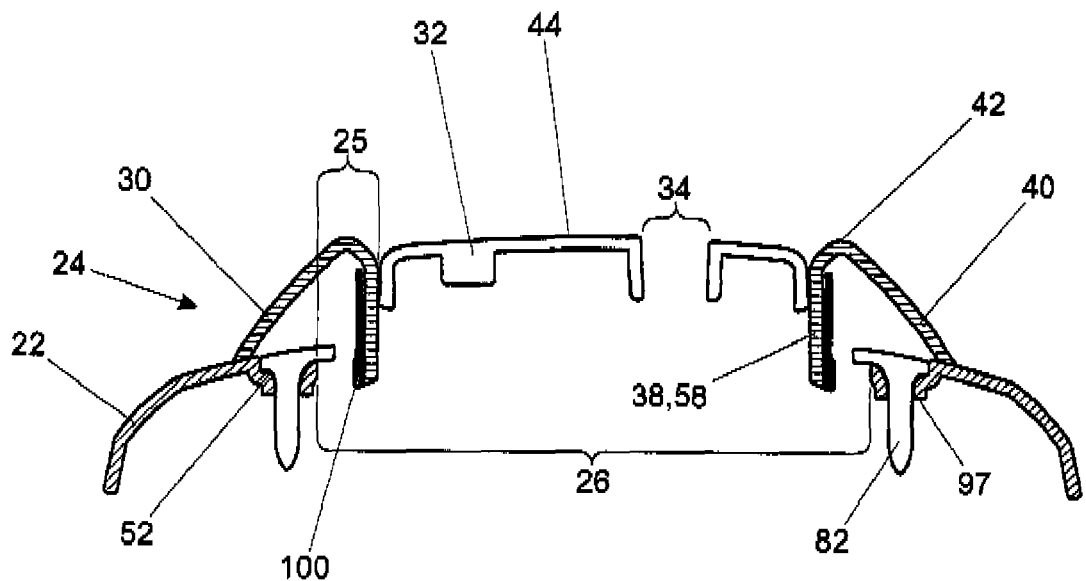
FIG. 2B is a sectional view taken along substantially the line Z-Z of FIG. 2A.

Referring now to FIG. 2B, it will be appreciated that when the finisher 30 is fixed to a gear selector plate 32 and the retaining ring 52 is fixed to the console 22, the finisher 30 surrounds the gear selector plate 32 and bridges a gap 25 between the plate 32 and the trim moulding 28 of the console 22.

In typical manner, the gear selector plate 32 has a slot 34 for accommodating an A/T gear selector lever (the lever is omitted from this figure), and spaces or windows 36 for associated indicia such as PRND. The plate 32 is mounted as in the related art discussed previously.

The finisher 30 will be described firstly with reference to FIGS. 2A, 2B. The finisher 30 is a ring that is shield-shaped in plan. The finisher 30 has a hollow, banked cross-section defined by inner and outer walls, 38 and 40 respectively, inclined away from a smoothly-radiused central ridge 42. The inner wall 38 extends downwardly and inwardly from the ridge 42 to the upper surface 44 of the gear selector plate 32. The outer wall 40 extends downwardly and outwardly from the ridge 42 to the surrounding trim moulding 28 of the console 22. The outer wall 40 deepens forwardly such that the ridge 42 inclines from an upper forward end to a lower rearward end 48. Conversely the inner wall 38 is substantially the same depth all around the gear selector plate 32.

The gear selector plate 32 is therefore disposed at substantially the same inclination as the ridge 42 with respect to the upper surface 50 of the console trim moulding 28.

Figure 3:
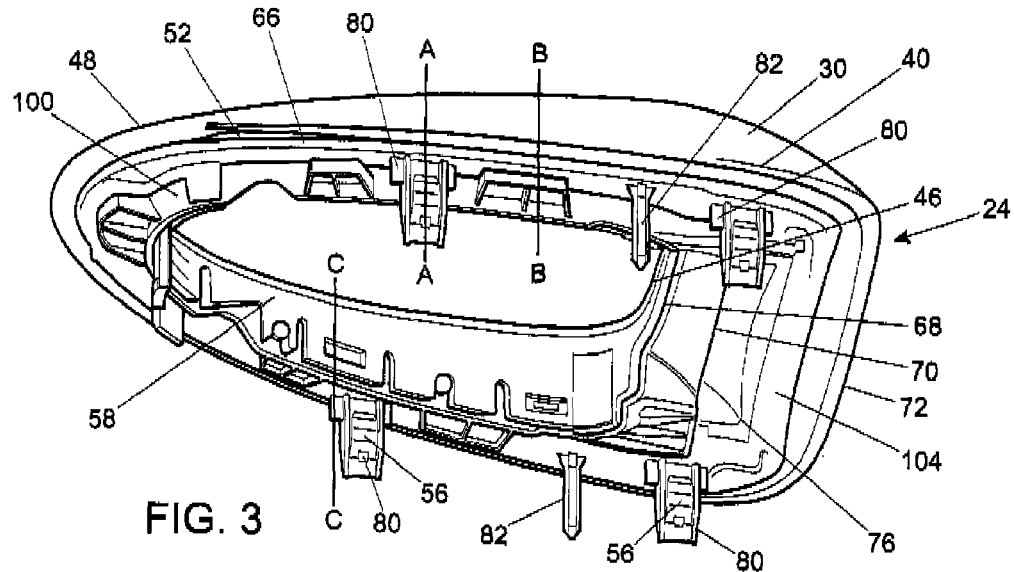
FIG. 3 is a perspective view from underneath of a gearshift finisher assembly in accordance with a first embodiment of the invention, shown in isolation.
Figure 4A:
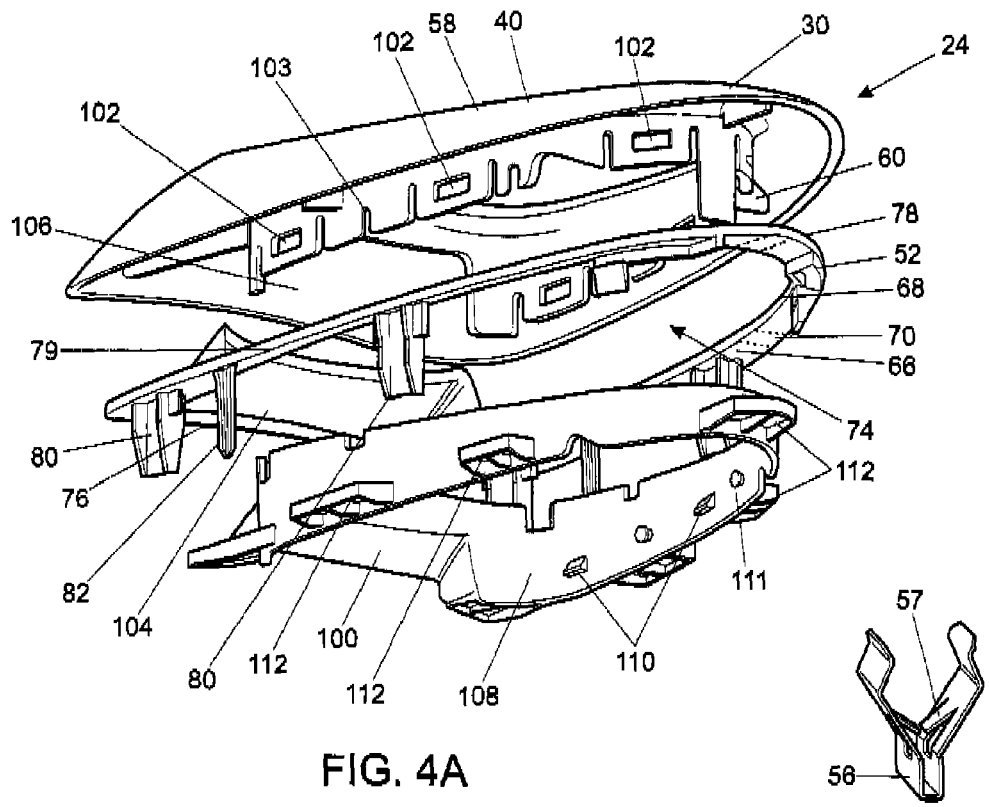
FIG. 4A is an exploded view of the assembly shown in FIG. 3.

The finisher 30 will be described in further detail with reference to FIGS. 3, 4A, 5A, 5B and 5C. FIGS. 3 and 4A show the gearshift finisher assembly 24 partially visible in FIG. 2A from underneath with both the gear selector plate 32 and the console trim moulding 28 omitted for clarity.

The finisher 30 has a deep skirt 58 depending straight down from the inner wall 38. The skirt 58 defines a receptacle for slidingly receiving and locating the gear selector plate 32 as will be appreciated from FIG. 2B. Ribs 60 spaced at intervals around the finisher 30 extend from the skirt 58 to the outer wall 40 to stiffen the outer wall 40. Those ribs 60 also co-operate to define a low-friction bearing surface 62 for relative movement between the finisher 30 and the retaining ring 52. The openings 102 and indentations 103 disposed around the bottom of the skirt 58 define engagement points for the plastics frame 100.

The retaining ring 52 will now be described in further detail with reference to FIGS. 3, 4A, 5A, 5B and 5C. The retaining ring 52 comprises a continuous contoured strip 66 whose shape broadly corresponds to the shield-like plan shape of the finisher 30 but is a little smaller and thinner in plan. Specifically, the width of the strip 66 from its inner edge 68 to its outer edge 70 is such that the retaining ring 52 can fit between the skirt 58 and the bottom edge 72 of the outer wall 40 of the finisher 30.

Moreover, the aperture 74 delineated by the inner edge 68 of the strip 66 is large enough to accommodate the skirt 58 of the finisher 30 with clearance all around the skirt 58, such that the finisher 30 can move laterally and longitudinally with its skirt 58 within the retaining ring 52.

The majority of the strip 66 of the retaining ring 52 lies substantially in one plane, save for slight inverse dishing, meaning that its inner edge 68 lies slightly above its outer edge 70 all round. However, the inner edge 68 of the forward transverse portion 76 of the strip 66 is raised further above the outer edge 70, whereby the forward transverse portion 76 of the strip 66 comprises a steeply inclined inner section that leads upwards from a substantially horizontal outer section to the raised inner edge at an angle of approximately forty-five degrees. The raised inner edge 68 and the inclined inner section of the forward transverse portion 76 combine to create an upwardly-extending pocket 104 in the forward transverse portion 76, which combines with a corresponding recess 106 in the skirt 58 of the finisher 30 to accommodate a forward protrusion of the gear selector plate 32. More generally, the forward transverse portion 76 of the strip 66 also has a slight convex curvature when viewed from above, this matching the curvature of the console 22 to which the retaining ring 52 is attached in use.

The upper face of the strip 66 of the retaining ring 52 is largely plain and featureless, save for the pocket 104 in the transverse portion 76 of the strip 66. The majority of the upper face of the strip 66 defines an upper bearing surface 78 that bears against bearing surface 62 of the ribs 60 between the skirt 58 and the outer wall 40 of the finisher 30.

Integral fixing and locating formations project from the lower face of the strip 66 of the retaining ring 52. Those formations comprise four downwardly-facing posts 80, two being disposed to each side of the strip 66, and two pins 82, one being disposed on each side of the strip 66, between each pair of posts 80 of the retaining ring 52. The majority of the lower face of the strip 66 defines a lower bearing surface 79 that bears against the plastics frame 100.

The plastics frame 100 will be described in further detail with reference to FIGS. 3, 4A, 5A, 5B and 5C. The plastics frame 100 is shaped as a contoured ring which follows the general plan form of the finisher 30 and the retaining ring 52. The general shape and size of the frame 100 is such as to fit snugly around the skirt 58 of the finisher 30, where an inner surface 108 of the frame 100 lies against an outer surface 59 of the skirt 58. However, the inner surface 108 of the frame 100 comprises six inward facing snap fitting projections 110, which are arranged in three pairs, one member of each pair being opposed to the other to each side of the frame 100. Further, the inner surface 108 of the frame 100 comprises four inward locating projections 111, which are arranged in two pairs.

The frame 100 also comprises seven outwardly-facing support projections 112 each having an upwardly facing surface that serves to engage with the lower bearing surface 79 of the strip 66. Six of the support projections 112 of the frame 100 are arranged in three pairs, one member of each pair being opposed to the other to each side of the frame 100, whilst the remaining projection 112 extends from the tapered rear end of the frame 100.

<Others>

Figure 5A:
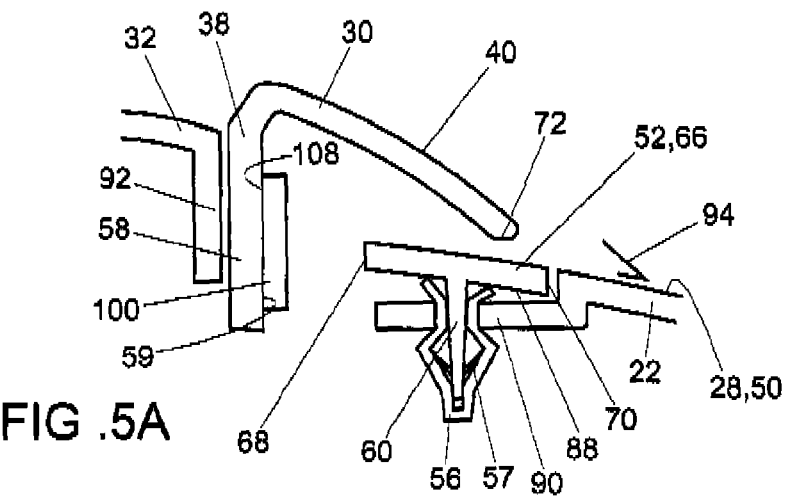
FIGS. 5A, 5B and 5C are enlarged sectional detail views taken along substantially the line A-A, B-B and C-C respectively of FIG. 3.
Figure 5B:
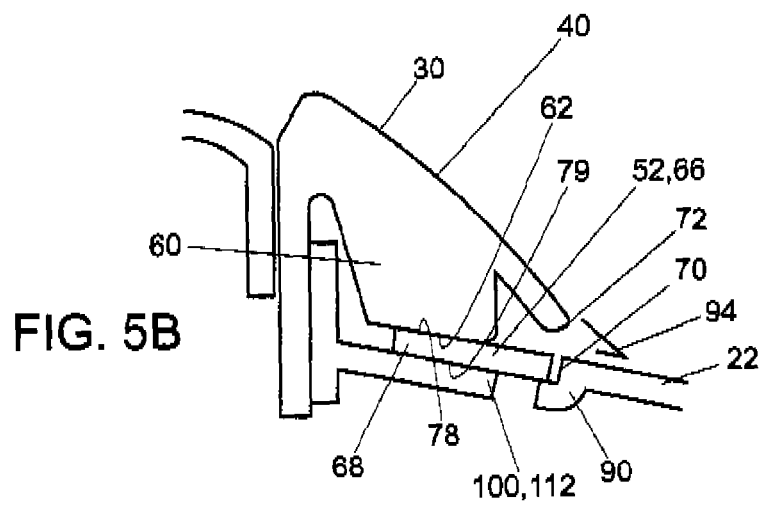
Figure 5C:
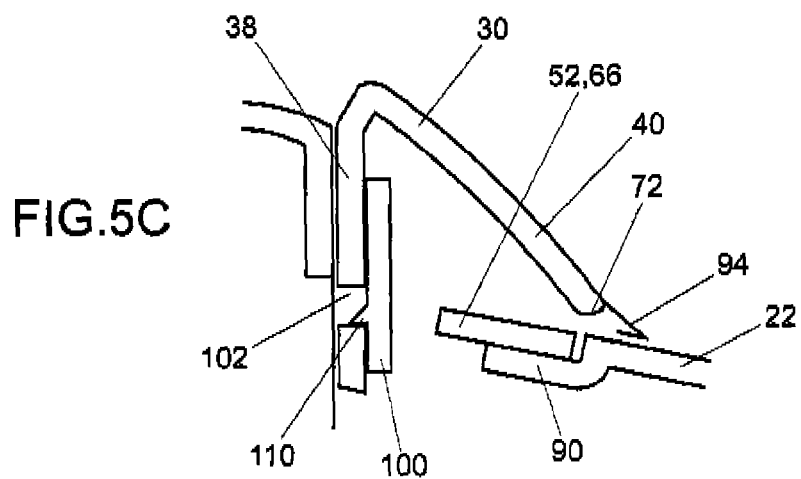

Some of the details shown particularly in FIGS. 5A, 5B and 5C have already been described above. Others will be mentioned now. All of those Figures also show the increased 'footprint' 94 defined by the extensive range of movement of the finisher 30 that the invention permits. FIG. 5(d) shows the rib 60 has a cutout portion 61 for accommodating the frame 100.

<Assembly of the Gearshift Finisher Assembly 24 Itself>

It will be described how the gearshift finisher assembly 24 is constructed from the finisher 30, the retaining ring 52, and the frame 100, with reference to FIGS. 5A, 5B, 5C. Firstly, the retaining ring 52 is placed between the finisher 30 and the frame 100, as exemplified by FIG. 5B. The projections 111 of the frame 100 are inserted into the indentations 103 in the skirt 58 of the finisher 30. Then, fixing projections 110 engage in a snap fit with the openings 102 in the skirt 58 of the finisher 30 so as to hold the frame 100 firmly in place, as exemplified by FIG. 5C.

In the finished assembly 24, the retaining ring 52 is trapped between the low-friction bearing surface 62 of the finisher 30 and the upwardly facing surfaces of the support projections 112 of the frame 100, as exemplified by FIG. 5B, whereby the finisher 30 is supported for sliding movement with respect to the retaining ring 52. The depth of the outwardly facing support projections 112 is such that, whilst permitting relative lateral movement between the finisher 30 and the retaining ring 52 in the finished assembly 24, the support projections 112 combine to prevent the inner retaining ring 52 from slipping past the frame 100. The aperture 74 of the retaining ring 52 is not large enough to accommodate passage of the frame 100 and its support projections 112 in the finished assembly 24.

Figure 4B:
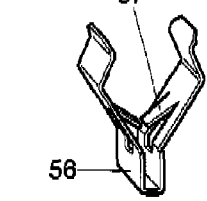
FIG. 4B is an enlarged view of a clip forming part of the assembly shown in FIG. 3.

The assembly 24 also includes clips 56 on the retaining ring 52 whose purpose is to attach the retaining ring 52 to the console trim moulding 28. The clips 56 are attached to the posts 80 of the retaining ring 52, as shown in FIG. 5B. Each clip 56 has a retaining portion 57 to prevent disengagement from the retaining ring 52. A detailed view of one of the clips 56 is shown in FIG. 4B.

When the finisher 30 and the retaining ring 52 are assembled and the frame 100 is applied to them, the projections 110 of the frame 100 apply downward pressure to the openings 102 of the finisher 30, as exemplified by FIG. 5C, while the projection 112 of the frame 100 applies simultaneously upward pressure to the bearing surface 79 of the retaining ring 52, as exemplified by FIG. 5B. Thus the components are urged or biased together to prevent relative vertical movement of one part with respect to the other. Yet, the frame 100 permits the relative lateral movement between the finisher 30 and the retaining ring 52 that is key to the function of the assembly 24, <Mounting of Assembly 24 to the Vehicle>

It will now be described how the gearshift finisher assembly 24 is mounted in a vehicle. Firstly, there is provided a vehicle having a gear selector lever and a gear selector plate 32 (the lever is omitted from all figures). Then, the console 22 is mounted in the vehicle. The gap 25 between the plate 32 and the trim moulding 28 of the console 22 is visible. Then, the assembly 24 is attached to the console, as exemplified by FIG. 2A.

It will be apparent from FIGS. 5A, 5B and 5C that the opening 26 in the console 22 has a peripheral rebate 88 that supports the retaining ring 52 upon a recessed flange 90. This accommodates the retaining ring 52 in a flush-mount manner, to assure a neat finish with minimal gaps between components. The recessed flange 90 around the opening 26 in the console 22 is provided with fixing sockets 96, as exemplified by FIG. 5A, and locating sockets 97, as exemplified by FIG. 2B. The fixing sockets 96 of the console 22 are spaced to correspond to the posts 80 that depend from the lower face of the strip 66 of the retaining ring 52, and the locating sockets 97 are spaced to correspond to the pins 82.

Each post 80 of the retaining ring 52 has a clip 56 to aid attachment to the console 22, as previously mentioned. Each clip 56 engages the periphery of a socket 96 in a recessed flange 90. The gear selector plate 32 has a skirt 92 depending from its upper surface 44 that fits closely within the skirt 58 of the finisher 30, as showed by FIGS. 5A, 5B and 5C.

During mounting, the assembly 24, is placed on the console 22 so that the skirt 58 of the finisher 30 faces the skirt 92 of the gear selector plate 32. Next, the gearshift finisher assembly 24 is simply pushed into the opening 26 in the console 22 until the posts 80 slide into the fixing sockets 96 and the clips 56 carried by the posts 80 engage around the associated the fixing sockets 96 to retain the assembly 24 in the opening 26, as shown in FIG. 5A. At that time, the pins 82 of the retaining ring 52 are received in corresponding of the locating sockets 97 of the console 22 to aid alignment and location of the retaining ring 52, as shown in FIG. 2B.

As a result, mounting of the gearshift finisher assembly 24 on the centre console 22, is achieved by attaching the retainer 52 to the trim moulding 28; engaging the finisher 30 with the retainer 52 with the help of the plastics frame 100 so as to allow floating movement of the finisher 30 with respect to the retainer 52; and attaching the finisher to the gear selector plate 32.

ADVANTAGES

In conclusion, the gearshift finisher assembly 24 bas the following advantages.

Firstly, vehicle assembly is facilitated by allowing for a large tolerance in the position of the gear selector lever in all directions with respect to its intended location, and by providing a finisher arrangement that can be applied to a wide range of gear selector levers or gear selector plates. Thus, as the retaining ring 52 is fixed to the console 22, the facility for relative movement between the finisher 30 and the retaining ring 52 allows for a large tolerance in the position of the gear selector plate 32 in all directions. Specifically, the lateral tolerance is allowed by floating between the finisher 30 and the retaining ring 52, and the vertical tolerance is allowed by skirt 58 of the finisher 30.

Secondly, the gearshift finisher assembly 24 permits a great deal of aesthetic design freedom, for example the creation of AT finishers of various three-dimensional shapes.

This is because the assembly 24 allows the joint between the assembly 24 and the console 22 to be hidden, and the finisher 30 is not directly attached to the console 22. The outer wall 40 of the finisher 30 largely conceals the retaining ring 52 when assembled and mounted in use.

Figure 6:
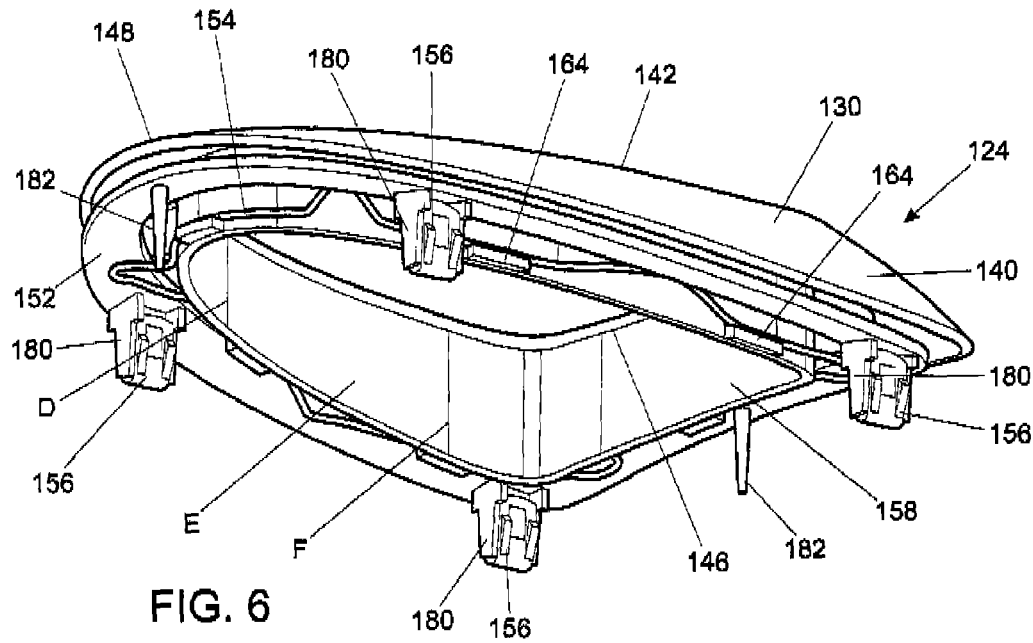
FIG. 6 is a perspective view from underneath of a gearshift finisher assembly in accordance with a second embodiment of the invention, shown in isolation.
Figure 7:
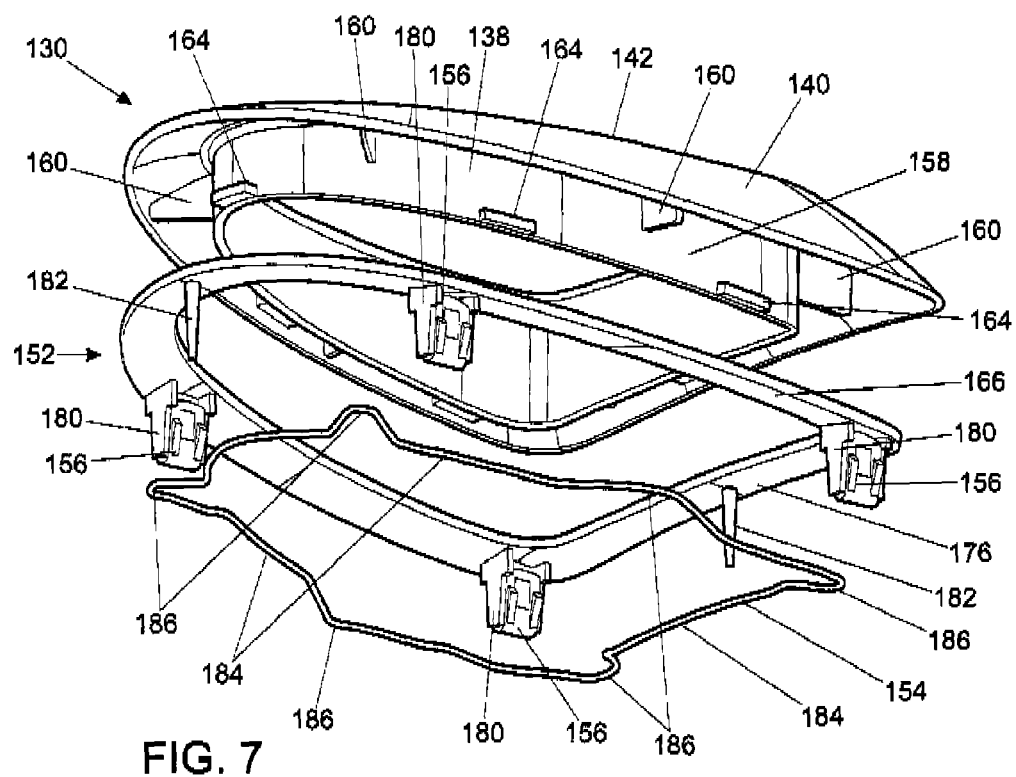
FIG. 7 is an exploded view of the assembly shown in FIG. 6.

Turning to the second embodiment of the detailed structure of the gearshift finisher assembly 124 of FIG. 2A, and referring now to FIGS. 6 and 7 of the drawings, the gearshift finisher assembly 124 is once again shown from underneath, with both the gear selector plate 32 and the console trim moulding 28 omitted for clarity. It will be apparent that the assembly 124 of the second embodiment comprises the finisher 130 shown in FIG. 2A, a retaining ring 152 that broadly corresponds to the plan form of the finisher 130, and a spring clip 154 that extends around the ring 152 and the finisher 130 to hold them together as will be explained. The assembly 124 also includes clips 156 on the retaining ring 152 whose purpose is to attach the retaining ring 152 to the console trim moulding 28, as will be best appreciated in the detail view of FIG. 8A to be described below.

Looking at FIGS. 6 and 7 in detail, it will be seen that the finisher 130 has a deep skirt 158 depending straight down from the inner wall 138. The skirt 158 defines a receptacle for slidingly receiving and locating the gear selector plate 32 as will be appreciated in FIGS. 8A, 8B and 8C to be described below. Ribs 160 spaced at intervals around the finisher 130 extend from the skirt 158 to the outer wall 140 to stiffen the outer wall 140. Those ribs 160 also co-operate to define a low-friction bearing surface 162 for relative movement between the finisher 130 and the retaining ring 152 as can be seen in FIG. 8B. Outwardly-facing lugs 164 disposed around the bottom of the skirt 158 are spaced at intervals to alternate with the ribs 160. These lugs 164 define engagement points for the spring clip 154 as will be explained with reference to FIG. 5C.

The retaining ring 152 comprises a continuous contoured strip 166 whose size and shape broadly corresponds to the size and shield-like plan shape of the finisher 130. The width of the strip 166 from its inner edge 168 to its outer edge 170 is such that the retaining ring 152 can fit between the skirt 158 and the bottom edge 172 of the outer wall 140 of the finisher 130. In this way the outer wall 140 of the finisher 130 largely conceals the retaining ring 152 when assembled and mounted in use. Moreover, the aperture 174 delineated by the inner edge 168 of the strip 166 is large enough to accommodate the skirt 158 of the finisher 130 with clearance all around the skirt 158, such that the finisher 130 can move laterally and longitudinally within the retaining ring 152. As the gear selector plate 32 is fixed to the finisher 130 and as the retaining ring 152 is fixed to the console 22, the facility for relative movement between the finisher 130 and the retaining ring 152 effects the desired floating mounting of the gear selector plate 32.

The strip 166 of the retaining ring 152 lies substantially in one plane save for slight inverse dishing, meaning that its inner edge 168 lies slightly above its outer edge 170 all round. The forward transverse portion 176 of the strip 166 also has a slight convex curvature when viewed from above, this matching the curvature of the console 22 to which the retaining ring 152 is attached in use.

The upper face of the strip 66 of the retaining ring 152, not visible in FIGS. 6 and 7, is largely plain and featureless. It defines a bearing surface 178 that bears against the underside 162 of the ribs 160 between the skirt 158 and the outer wall 140 of the finisher 130 as exemplified by FIG. 8B, whereby the finisher 130 is supported for sliding movement with respect to the retaining ring 152.

Integral fixing and locating formations project from the lower face of the strip 166 of the retaining ring 152. Those formations comprise four downwardly-facing posts 80, two being disposed to each side of the strip 166, and two pins 182, one being disposed centrally at each of the forward and rearward ends of the retaining ring 152. The posts 180 are attachment points for clips 156 whose function is best appreciated in FIG. 8A to be described below. The pins 182 are received in corresponding holes adjacent the opening 126 in the console trim moulding 128 to aid alignment and location of the retaining ring 152 during assembly and in use.

The spring clip 154 is a continuous loop of stiff but resilient wire, shaped to follow the general plan form of the finisher 130 and the retaining ring 152. Specifically the general shape and size of the loop is such as to fit snugly around the skirt 158 of the finisher 130, where inner portions 184 of the loop lie against the skirt 158 and engage the lugs 164 as aforesaid, as shown in FIG. 5C. However, the loop is deformed locally to define six projections 186 spaced around the loop that alternate with the inner portions 184 of the loop which engage the lugs 164. Those projections 186 are grouped in three pairs, one member of each pair being opposed to the other to each side of the loop, such that the loop is symmetrical about its central longitudinal axis. In the finished assembly 124, the projections 186 bear against the underside of the strip 166 of the retaining ring 152. So, when the finisher 130 and retaining ring 152 are assembled and the spring clip 154 is applied to them, the spring clip 154 applies downward pressure to the lugs 164 of the finisher 130 while simultaneously applying upward pressure to the retaining ring 152, thus urging or biasing those components together to prevent relative vertical movement of one part with respect to the other. Yet, the spring clip 154 permits the relative lateral movement between the finisher 130 and the retaining ring 152 that is key to the function of the assembly 124.

Figure 8A:
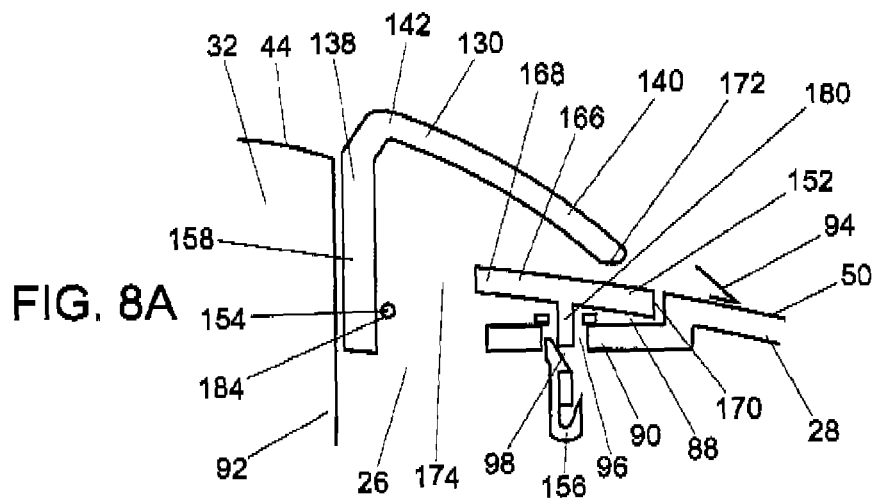
FIGS. 8A, 8B and 8C are enlarged sectional detail views taken at points D, E and F respectively of FIG. 6.
Figure 8B:
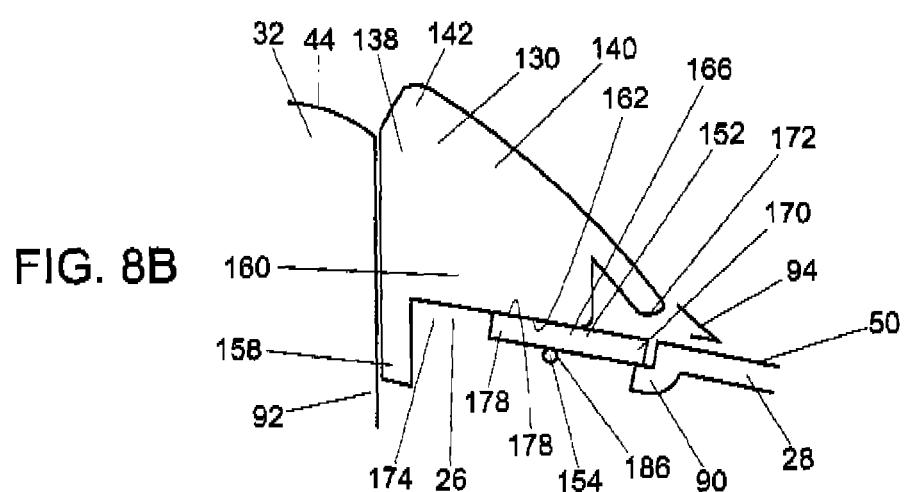
Figure 8C:
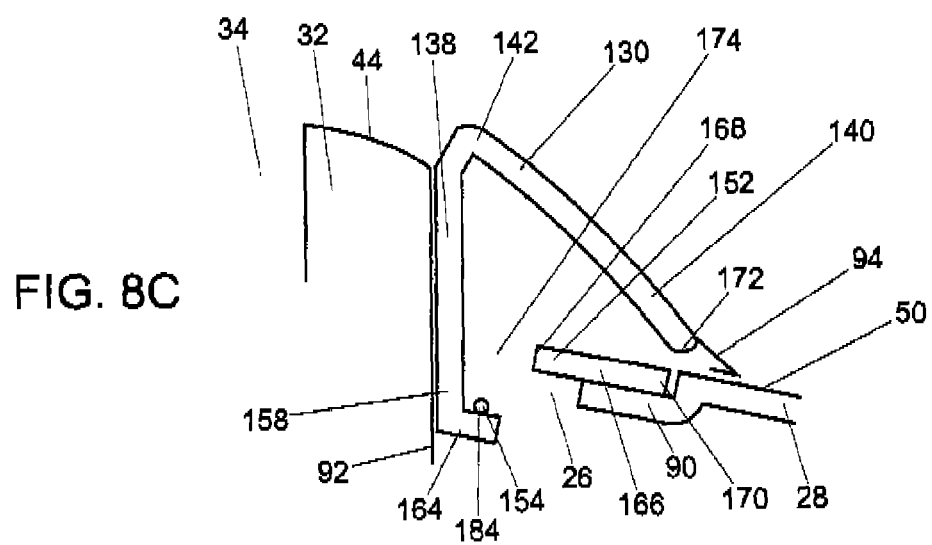

Some of the details shown particularly in FIGS. 8A, 8B and 8C have already been described above. Others will be mentioned now. For example it will be apparent from all of those drawings that the opening 26 in the console 22 has a peripheral rebate 88 that supports the retaining ring 152 upon a recessed flange 90. This accommodates the retaining ring 152 in a flush-mount manner, to assure a neat finish with minimal gaps between components and to allow smooth sliding movement of the finisher 130 with respect to the retaining ring 152.

All of FIGS. 8A, 8B and 8C show that the gear selector plate 32 has a skirt 92 depending from its upper surface 44 that fits closely within the skirt 158 of the retainer. All of those drawings also show the increased 'footprint' 94 defined by the extensive range of movement of the finisher 130 that the invention permits.

Finally, FIG. 5A shows how the recessed flange 90 around the opening 26 in the console 22 is provided with sockets 96, one of which is shown in that Figure. The sockets are spaced to correspond to, and to receive, the posts 180 that depend from the lower face of the strip 166 of the retaining ring 152. Each post 180 has a hole 98 for attachment of a clip 156 to the retaining ring 152, which clip 156 also engages the periphery of the socket 96 in the recessed flange 90. During vehicle manufacture, the gearshift finisher assembly 124 is simply pushed into the opening 26 in the console 22 until the posts 180 slide into their sockets 96 and the clips 156 carried by the posts 180 engage around the associated sockets 96 to retain the assembly 124 in the opening 26.

Mounting of the gearshift finisher assembly 124 according to either embodiment, on the centre console 22, is achieved by attaching the retainer 152 to the trim moulding 28; engaging the finisher 130 with the retainer 152 with the help of the plastics frame 100 or wire clip 54 so as to allow floating movement of the finisher 30/130 with respect to the retainer 152; and attaching the finisher to the gear selector plate 32.

The entire contents of United Kingdom patent application No. 0526289.4 with a filing date of Dec. 23, 2005 and European patent application No. 06125088.2 with a filing date of Nov. 30, 2006 are herein incorporated by reference.

Many variations are possible within the inventive concept. For example, the provision of a plastics frame or a spring clip is an optional feature, albeit preferred: it is possible for the retaining ring to be held directly by projections integral with or attached to the finishers with elastic deformation of one or both of the components permitting their assembly. Accordingly, reference should be made to the appended claims rather than to the foregoing specific description in determining the scope of the invention.

What is claimed is:

1. A gearshift finisher assembly comprising:
a gear selector plate;
a finisher which bridges a gap between the gear selector plate and an adjacent or surrounding vehicle trim panel; and
a retainer fixed to the trim panel, the retainer having a plurality of posts, which are inserted into fixing sockets provided with the trim panel in order to fix the retainer to the trim panel;
wherein the finisher is engaged with the retainer such that the finisher can move laterally and longitudinally within the retainer.

2. The assembly of claim 1, wherein the finisher is engaged with the retainer via a fastener shaped to engage the finisher and the retainer.

3. The assembly of claim 2, wherein the fastener is arranged resiliently to urge together the finisher and the retainer.

4. The assembly of claim 3, wherein the fastener is a plastic frame.

5. The assembly of claim 3, wherein the fastener is a spring clip.

6. The assembly of claim 1, wherein the finisher has a skirt facing the gear selector plate.

7. The assembly of claim 1, wherein the retainer is a ring that generally corresponds to a plan form of the finisher and accommodates a skirt depending from the finisher, with clearance between the skirt and the retainer such that the finisher and the gear selector plate can move laterally and longitudinally within the retainer.

8. The assembly of claim 1, wherein the finisher defines a downwardly-facing bearing surface for sliding contact with an upper face of the retainer.

9. A fastener shaped to engage the finisher and the retainer of the gear shift finisher assembly of claim 1, the fastener comprising a flexible frame having a plurality of formations for engaging at least one of the finisher and the retainer, the frame being arranged to hold together the finisher and the retainer.

10. A method of mounting a gearshift finisher assembly to a vehicle with a gap between a gear selector plate and an adjacent or surrounding vehicle trim panel, the gearshift finisher assembly comprising:
the gear selector plate; a finisher which bridges the gap; and a retainer fixed to the trim panel, the retainer having a plurality of posts, which are inserted into fixing sockets provided with the trim panel in order to fix the retainer to the trim panel; wherein the finisher is engaged with the retainer such that the finisher can move laterally and longitudinally within the retainer, the method comprising:
fixing the retainer to the trim panel;
engaging the finisher with the retainer such that the finisher can move laterally and longitudinally within the retainer; and
attaching the finisher to the gear selector plate.

11. The assembly of claim 2, wherein a part of the retainer is directly sandwiched between the finisher and the fastener.

12. The assembly of claim 2, wherein the fastener is shaped as a contoured ring which follows a plan form of the finisher and the retainer.

13. A gearshift finisher assembly comprising:
a gear selector plate;
a finisher which bridges a gap between the gear selector plate and an adjacent or surrounding vehicle trim panel; and
a retainer fixed to the trim panel,
wherein the retainer is a ring that generally corresponds to a plan form of the finisher and accommodates a skirt depending from the finisher, with clearance between the skirt and the retainer such that the finisher with the gear selector plate can move laterally and longitudinally with the retainer,
wherein the finisher is engaged with the retainer such that the finisher can move laterally and longitudinally within the retainer.

14. A gearshift finisher assembly comprising:
a gear selector plate;
a finisher which bridges a gap between the gear selector plate and an adjacent or surrounding vehicle trim panel; and
a retainer fixed to the trim panel,
wherein the finisher is engaged with the retainer such that the finisher can move laterally and longitudinally within the retainer, and
wherein the finisher defines a downwardly-facing bearing surface for sliding contact with an upper face of the retainer.

* * * * *